March 12, 1963    E. J. PENN    3,080,710
JET THRUST REVERSER
Filed Nov. 30, 1960
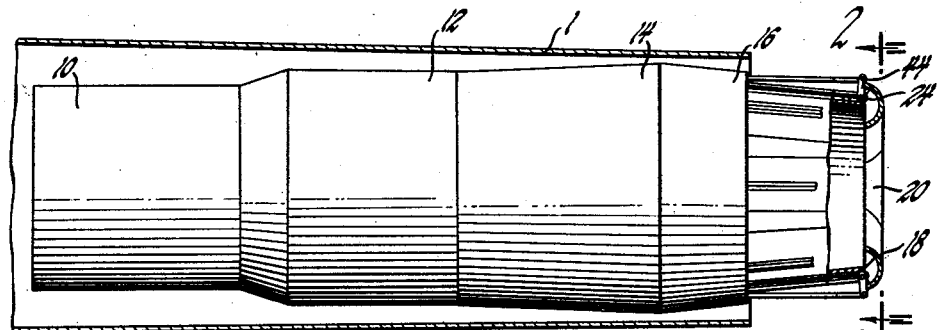
Fig. 1
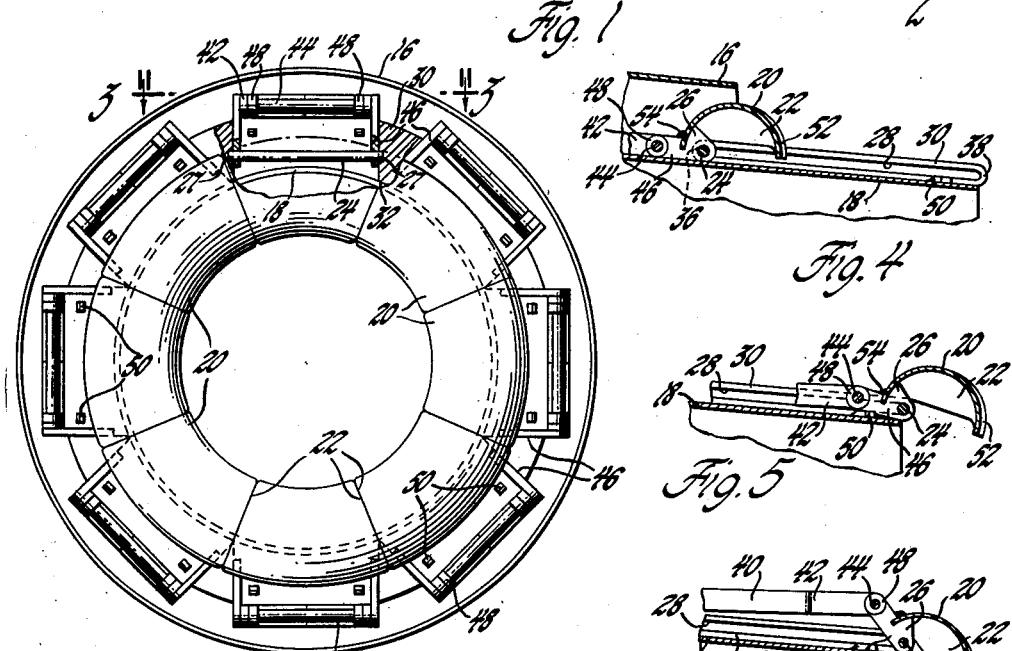
Fig. 2
Fig. 4
Fig. 5
Fig. 6
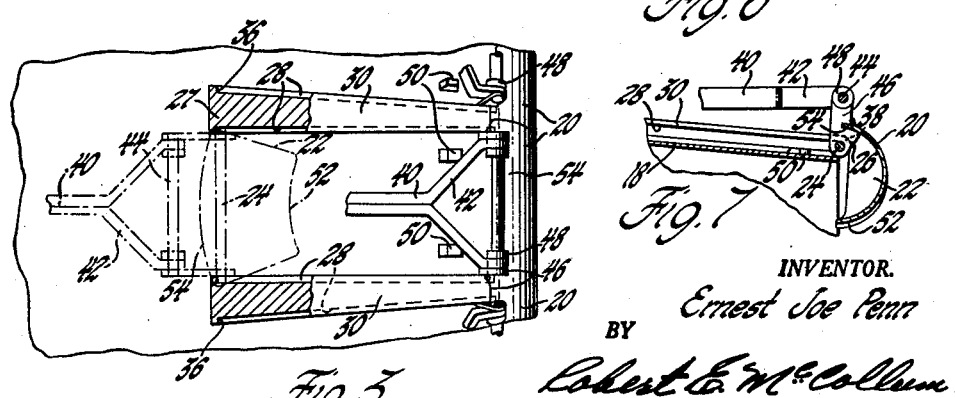
Fig. 3
Fig. 7
INVENTOR.
Ernest Joe Penn
BY
Robert E. McCollum
ATTORNEY 3,080,710
JET THRUST REVERSER
Ernest Joe Penn, Indianapolis, Ind., assignor to General Motors Corporation, Detroit, Mich., a corporation of Delaware
Filed Nov. 30, 1960, Ser. No. 72,785
2 Claims. (Cl. 60—35.54)

This invention relates to a jet engine thrust reverser.

The high landing speeds of present day jet aircraft and the long runway length required necessitates providing some means in addition to the normal wheel braking devices for braking the aircraft. Some installations have utilized the jet engine exhaust stream in connection with thrust reverser vanes to provide a landing brake. It is this type of thrust reverser with which the present invention is concerned.

Therefore, it is an object of this invention to provide a jet thrust reverser providing a forward component to the direction of flow of the jet stream emanating from an aircraft jet exhaust nozzle to brake the aircraft's forward progress.

It is a further object of the invention to provide a jet propulsion nozzle with jet stream direction reversing scoops pivotally connected to the nozzle and rotatable into the jet stream to direct the stream past the outside of the nozzle in a direction substantially reverse to its normal direction.

Other features, objects and advantages will become apparent upon reference to the succeeding detailed description of the invention and to the drawings illustrating the preferred embodiment thereof, wherein;

FIGURE 1 is a side elevational view of a jet engine embodying the invention;

FIGURE 2 is an enlarged end view of the engine of FIG. 1 taken on a plane indicated by and viewed in the direction of the arrows 2—2 of FIG. 1;

FIG. 3 is a plan view of a portion of FIG. 2 with parts broken away and in section taken on a plane indicated by and viewed in the direction of the arrows 3—3 of FIG. 2; and, FIGURES 4 to 7 are cross-sectional views of details illustrating the invention in different operative positions.

The invention comprises, in general, slidably and rotatably mounting a number of 180° jet stream direction reversing scoops on a jet engine exhaust duct in such a manner that they can be slid rearwardly along the duct to the end and then rotated into the jet exhaust stream to deflect it forwardly outside the duct to brake the forward motion of the engine; or, they can be rotated out of the jet stream and slid forwardly along the outside of the duct to a retracted inoperative position.

FIG. 1 shows schematically an annular aircraft nacelle 1 enclosing a gas turbine engine of the axial flow type having a compressor section 10, a combustion section 12, a turbine section 14, and a fixed exhaust nozzle 16. Further details of the engine construction per se will not be given since they are known and are believed to be unnecessary for an understanding of the invention.

The exhaust nozzle 16 is defined by a frusto-conical duct 18 having a decreasing taper from the turbine to the nozzle exit. In normal operation, the engine exhaust gases flow out through the duct in a rearward direction, or from left to right as seen in FIG. 1. As previously stated, a number of jet stream deflecting scoops are adapted to be pivotally and slidably mounted on the duct for movement into and out of the path of the jet stream. Each of the scoops, of which there are eight in this particular installation, has a sheet metal shell 20 arcuately curved from side to side. The scoops are reinforced at each side by a thin stiffening rib 22, and taper radially from end to end so as to each form an arcuate section of a complete assembly, as seen best in FIG. 2. One end of each of the scoops is rigidly connected to a shaft 24 by means of ears 26 projecting from and welded to the scoops at each side. The ends 27 of each of the shafts project beyond the sides of the scoop and are each slidably and rotatably received in a longitudinally extending slot or guideway 28 in a guide rail 30.

Each of the eight guide rails 30 is the sector of a right circular cone having an edge 32 welded to the outer surface of the duct 18. Each rail is substantially triangular in cross-section as seen in FIG. 2, and extends along the outer surface of the duct. The rails taper longitudinally to maintain the same distances between cooperating guideways or slots 28 to provide the proper sliding action for the scoops.

As thus far described therefore, the scoops slide fore and aft along the outside of the duct 18 by means of the shafts 24 confined in the guideways 28. The scoops are fully retracted when the shafts 24 reach the forward ends 36 of the slots, and are ready to be rotated or pivoted into the path of the jet stream when the shafts reach the rearward ends 38 of the slots. The means for both sliding and rotating each of the scoops includes a number of actuating yokes 40, one for each scoop. The yokes each have arms 42 pivotally connected by a shaft 44 to actuating links 46. Links 46 are each non-rotatably secured on shaft 24 by being welded to the scoops. Two rollers 48 are journaled on each shaft 44 to roll on the duct surface and are adapted to cooperate with two cams 50 in a manner to be described. The cams are each secured to the duct 18 near the exit end and are positioned in the path of the movement of rollers 48 to be engaged thereby.

As best seen in FIG. 4, the dimensions of yoke arms 42, rollers 48 and scoop links 46, and the connections between them are such that the links and yoke arms are aligned where the scoops are in retracted or non-thrust reversing position. The application of force to yokes 40 by means not shown therefore slides the yoke arms 42, links 46 and scoops as a unit toward the duct exit. The cams 50 are so located with reference to the guideways that the rollers 48 initially contact the cams 50 just prior to the shafts 24 reaching the end of the slot. Immediately rollers 48 ride upon cams 50 and are forced outwardly (FIG. 5) to pivot yoke arms 42 and links 46 relative to each other about shaft 44. Shaft 24 has now reached the end of the slot and therefore acts as a fulcrum for the unit. Further force applied to the yoke arms therefore continues to rotate the scoops into the path of the jet stream (FIG. 6) until the scoops reach the full thrust reversing position shown in FIG. 7. In this position, the scoops straddle the exit edge of the duct with the inlet 52 end projecting radially into the jet stream and the outlet end 54 projecting out of the jet stream radially past the edge of the duct.

It will be noted from FIG. 2 that as the scoops simultaneously move along the conical sectors toward the duct exit, they circumferentially approach each other. Therefore, as soon as they pivot into the jet stream, the adjacent tapered sides of each scoop mate to form a complete annular shell providing a continuous annular jet stream direction reversing surface. The inlet portion 52 of the scoop annulus then directly receives the jet stream of exhaust gases and turns them 180° discharging them in a forward direction through the outlet scoop portion 54 past the outside of the exhaust duct and nacelle providing a forward or reverse thrust component to the jet stream. The forward motion of this discharged gas is immediately opposed by the rearwardly moving stream of ram air outside the aircraft nacelle 1 to apply a braking action to the engine and aircraft. It is to be noted that the jet stream applies a force to the scoops when in operative position tending to pivot them out; however, the actuating mechanism (not shown) moving arms 42 into the stream effectively prevent this.

Withdrawing the scoops from the jet stream is of course accomplished by reversing the movement of the yokes to rotate the scoops out of the jet stream and slide them along the duct into retracted position in the manner opposite to that shown in FIGS. 4–7. While no actuators have been illustrated for moving yokes 40, it will be clear that hydraulically operated or any other suitable means could be used without departing from the scope of the invention.

From the foregoing, therefore, it will be seen that the invention provides an effective thrust reversing mechanism contained wholly on the outside of an exhaust duct and pivotal into the jet stream to a thrust reversing position. The invention further provides a mechanism economical to manufacture and simplified in construction, and one easily adaptable to engines not provided with thrust reversers.

While the invention has been illustrated in its preferred embodiment in connection with a jet engine having a fixed exhaust nozzle, it will be clear to those skilled in the art to which this invention pertains that many modifications may be made thereto without departing from the scope of the invention.

I claim:

1. A thrust reversing mechanism for a fluid jet reaction motor having an annular exhaust duct discharging a fluid jet exhaust stream therethrough, comprising a number of circumferentially arranged and adjacent individual stream direction reversing scoops each pivotally mounted at one portion on the exterior surface of said duct and pivotable into the jet exhaust stream to form together a semi-toroidal hollow member having its open portion facing the jet stream to receive a portion of it therein and discharge the stream past the outside of the duct in a direction substantially reverse to the normal direction of flow of the jet stream, guide means secured to said duct along the outside thereof, a pivot pin rotatably and slidably mounted in said guide means and fixedly secured to each of said scoops, a number of sets of force transmitting links each comprising a pair of axially extending end-to-end links pivotally secured to each other at one end and the opposite end of the aft link being rigidly secured to one of said scoops and its associated pin, the application of a substantially axially directed force through the forward links moving said pairs of links between forward and aft positions, the forward position of said links aligning the link pivot and pin with the direction of application of force to slide said scoops, stop means for halting rearward axial movement of said pivot pin short of the full actuating stroke, and cam means engaged by the link pivot in the rearward sliding movement of the scoops at substantially the time that said pin engages said stop means to cam said link pivot and pin means out of alignment to thereby effect rotation of said scoops in the said guide means into the jet stream upon the further movement of said force.

2. A thrust reversing mechanism for a fluid jet reaction motor having an annular fluid exhaust duct passing a stream of exhaust fluid therethrough normally in one direction, said mechanism including a guideway secured to the exterior surface of said duct and extending axially therealong to the exit edge of said duct, a stream direction changing scoop having substantially a cup shape in cross section slidably and rotatably mounted in said guideway for an axially slidable movement of said scoop in one direction to the exit edge of said duct followed by a pivotal movement of said scoop around the said edge partially into the jet stream, the mounting of said scoop in said guideway and the scoop pivotal movement positioning said scoop to straddle the exit edge of said duct for receiving said jet stream in one scoop portion and discharging said stream out of said scoop past the exterior surface of said duct in a direction substantially opposite to that of the normal direction of flow of said exhaust fluid stream, and force means to effect the sliding and pivotal movement of said scoop, said force means comprising a first link having one end slidably and pivotally mounted in said guideway and fixed to said scoop, a second link having a pivoted connection to the opposite end of said first link and movable along the duct surface therewith, said links being so constructed and arranged as to transmit an axial force when axially aligned to axially slide said scoop in said one direction, stop means on said guideway for stopping the axial movement of said first link and scoop, and cam means on said duct cooperating with said stop means for camming said links pivotal connection radially outwardly substantially simultaneously with the engagement of said first link and scoop with said stop means to pivot said scoop around the exit edge of said duct moving a portion of said scoop into the jet stream.

References Cited in the file of this patent
UNITED STATES PATENTS

| 2,841,954 | Rainbow | July 8, 1958 |
| 2,932,164 | Watson | Apr. 12, 1960 |

FOREIGN PATENTS

| 778,008 | Great Britain | July 3, 1957 |